Jan. 6, 1925.

P. ELLIS

SWAGING TOOL

Filed Sept. 12, 1923

1,521,805

WITNESSES

INVENTOR
Paul Ellis.
BY
ATTORNEYS

Patented Jan. 6, 1925.

1,521,805

UNITED STATES PATENT OFFICE.

PAUL ELLIS, OF AUGUSTA, GEORGIA.

SWAGING TOOL.

Application filed September 12, 1923. Serial No. 662,304.

*To all whom it may concern:*

Be it known that I, PAUL ELLIS, a citizen of the United States, and resident of Augusta, in the county of Richmond and State of Georgia, have invented certain new and useful Improvements in Swaging Tools, of which the following is a specification.

My invention relates to improvements in swaging tools and it consists of the constructions, combinations and arrangements herein described and claimed.

An object of the invention is to provide a tool to be used in connection with a pneumatic hammer for the purpose of expeditiously flaring or turning over the ends of boiler tubes.

A further object of the invention is to provide a swaging tool designed to impart the blows of a pneumatic hammer at a plurality of places at the end of a boiler tube simultaneously.

A further object of the invention is to provide a swaging tool for preliminarily flaring or turning over the ends of boiler tubes against the boiler head, said tool being shaped like a spear so that blows may be imparted at diametrically opposite points simultaneously.

Other objects and advantages will appear in the following specification, reference being had to the accompanying drawing, in which—

Figure 1:
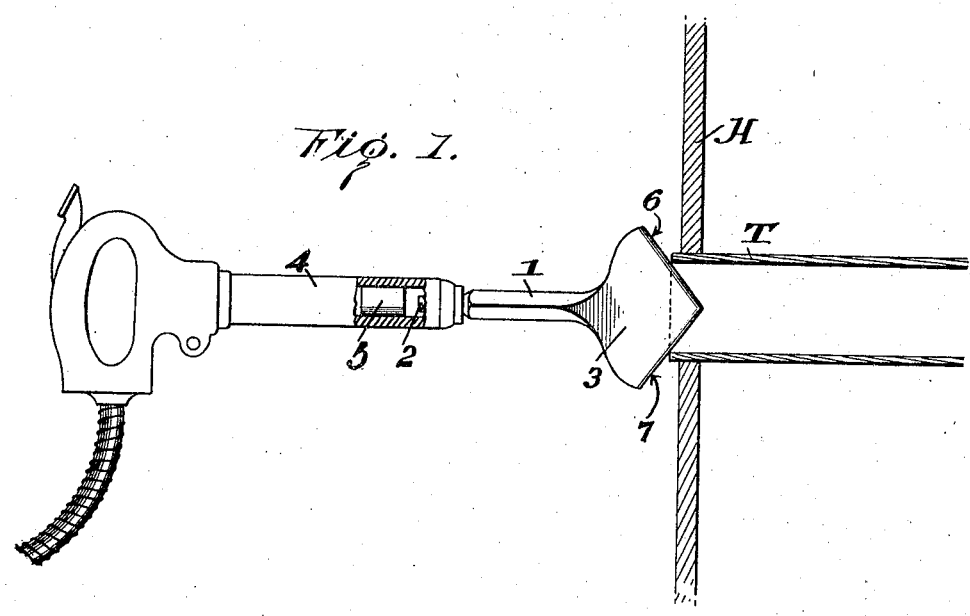
Figure 2:
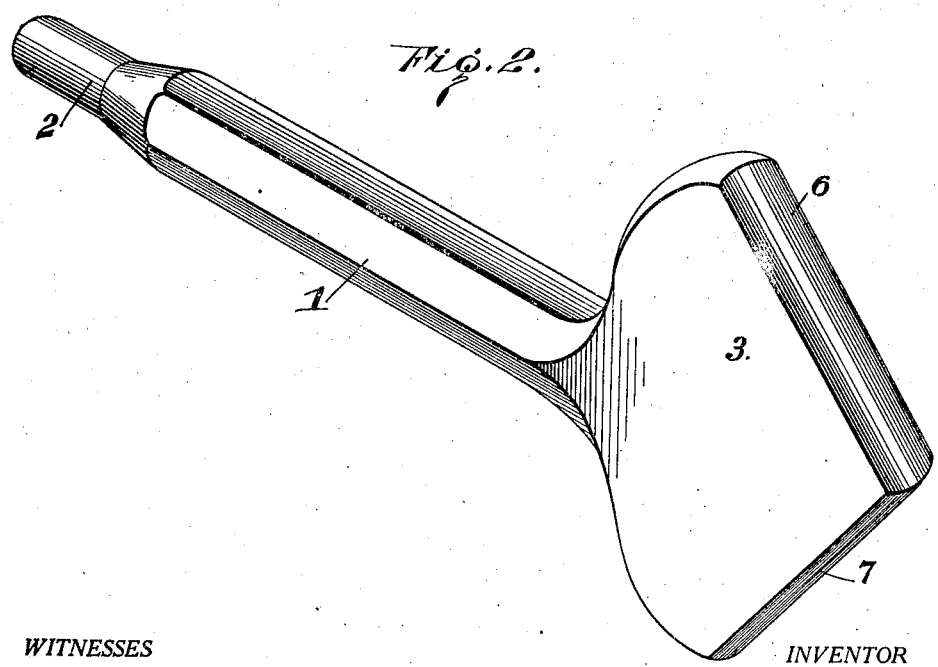

Figure 1 is a side elevation, partly in section, illustrating the application of the improved swaging tool, and Figure 2 is a perspective view of the tool.

The improved tool is to be used in connection with an air hammer for flaring or turning over the ends of boiler tubes or flues against the outside of a boiler head preliminarily to the final beading which insures the necessary tight joint.

This work is usually done with a round faced hand hammer and requires considerable time and skill to be done correctly. The object of the invention is to provide a swaging tool which is so shaped that the former hand work can be done not only with better uniformity but also considerably more quickly.

For these purposes the swaging tool comprises a bar 1 which terminates in a shank 2 at one end and a flat spear head 3 at the other end. Both the bar 1 and shank 2 may be of any desired length. The shank 2 is intended to be fitted into a pneumatic hammer 4 so that the driving member 5 may impact the end of the shank according to the well known mode of operation of pneumatic hammers.

The spear head 3 has edges 6 and 7 situated at obtuse angles to each other. These edges are rounded in the plane at right angles to the axis of the tool, this rounding being intended to facilitate the flaring of the end of the tube T into which the point of the spear 3 is inserted as in Figure 1.

In assembling boilers the ends of the tube T are permitted to protrude at the front of the head H sufficiently to form a bead when turned back against the head. It is necessary to preliminarily flare the protruding ends of the tubes before the beading work is done. To flare the end of the tube T the spear 3 is inserted as shown whereupon the operation of the pneumatic hammer 4 is started.

The blows of the driving element 5 are imparted to the end of the tube T at diametrically opposite places simultaneously, this by virtue of the spear shape of the head. The rod 1 is turned as the swaging operation proceeds so that the projecting end of the tube T may be uniformly flared all around the inner circumference of the tube.

It may be stated that in defining the edges 6 and 7 as being round it is meant that the impacting surface is rounded and may possibly more properly be described as being oval. It may also be stated that the angle defined by the edges 6 and 7 is not necessarily obtuse. The angle of the edges 6 and 7 may be more or less than a right angle. It is to be borne in mind that the imparting of blows at a plurality of places simultaneously not only materially shortens the time it takes to swage the end of a tube but also contributes to the quality of the work.

While the construction and arrangement of the improved swaging tool as herein described and claimed is that of the generally preferred form, obviously modifications and changes may be made without departing from the spirit of the invention or the scope of the claims.

I claim:—

1. A swaging tool comprising a single spear-shaped head having a plurality of edges so arranged at angles to the axis of the tool as to simultaneously contact diametrically opposite parts of a boiler tube end, a rod on which said head is formed, and a shank at the end of the rod upon which a blow is adapted to be delivered to produce impacts upon said boiler tube at said contacted parts.

2. A swaging tool comprising a rod having a shank at one end, and at the other end having a flat, spear-shaped head rounded at the edges.

PAUL ELLIS.